United States Patent
Cai et al.

(10) Patent No.: US 8,380,213 B2
(45) Date of Patent: Feb. 19, 2013

(54) SEMI-PERSISTENT RESOURCE RELEASE BY WIRELESS COMMUNICATION DEVICE

(75) Inventors: Zhijun Cai, Irving, TX (US); Takashi Suzuki, Ichikawa (JP); Yi Yu, Irving, CA (US)

(73) Assignee: Motorola Mobility LLC, Libertyville, IL (US)

( * ) Notice: Subject to any disclaimer, the term of this patent is extended or adjusted under 35 U.S.C. 154(b) by 497 days.

(21) Appl. No.: 12/640,316

(22) Filed: Dec. 17, 2009

(65) Prior Publication Data

US 2010/0151874 A1    Jun. 17, 2010

Related U.S. Application Data

(60) Provisional application No. 61/138,323, filed on Dec. 17, 2008.

(51) Int. Cl.
H04W 72/00    (2009.01)

(52) U.S. Cl. ............ 455/450; 455/452.1; 455/509; 370/329

(58) Field of Classification Search ....... 455/450–452.2, 455/509; 370/329
See application file for complete search history.

(56) References Cited

U.S. PATENT DOCUMENTS

| | | | | |
|---|---|---|---|---|
| 7,830,837 | B2 * | 11/2010 | Park et al. | 370/329 |
| 8,009,606 | B2 * | 8/2011 | Seo et al. | 370/319 |
| 8,155,067 | B2 * | 4/2012 | Wang et al. | 370/329 |
| 8,295,240 | B2 * | 10/2012 | Suzuki et al. | 370/329 |
| 2009/0238128 | A1 * | 9/2009 | Park et al. | 370/329 |
| 2010/0118807 | A1 * | 5/2010 | Seo et al. | 370/329 |
| 2011/0170483 | A1 * | 7/2011 | Ishii | 370/328 |

FOREIGN PATENT DOCUMENTS

| WO | 2008024890 A2 | 2/2008 |
|---|---|---|
| WO | 2009134196 A1 | 11/2009 |

OTHER PUBLICATIONS

Extended European Search Report and Opinion for EP 09179769.6, mailed Mar. 25, 2010.
Ericsson et al.: "Control of semi persistent scheduling," 3GPP Draft; R2-080765 Control of Semi Persistent Scheduling, 3rd Generation Partnership Project (3GPP), Mobile Competence Centre; vol. RAN WG2, no. Sorrento, Italy; 20080205, Feb. 2, 2008 , XP050138589.
Ericsson: "Remaining issues in Semi Persistent Scheduling," 3GPP Draft; R2-082153, vol. Ran WG2, no. Kansas City, USA; Apr. 27, 2008, XP050139932.
Anonymous: "3GPP TS 36.212 Vi.0.0 (Sep. 2007) Technical Specification 3rd Generation Partnership Project; Technical Specification Group Radio Access Network; Evolved Universal Terrestrial Radio Access (E-UTRA); Mutiplexing and channel coding (Release 8);" 3GPP TS 36.212 V8.0.0 (online), vol. 36.212, No. v8.0.0, Sep. 1, 2007 p. 1-30, XP002539820.
Notification of Transmittal of International Search Report; International Search Report and Written Opinion for PCT/US2009/068242, mailed Apr. 12, 2010.
Nokia, Nokia Siemens Networks: "Missing details of semi-persistent scheduling", 3GPP TSG-RAN WG1 Meeting #54bis, Prague, Czech Republic, Sep. 29-Oct. 3, 2008, R1-083718, all pages.

* cited by examiner

Primary Examiner — Sharad Rampuria

(57) ABSTRACT

A method for causing a user agent to release at least one of uplink and downlink semi-persistent communication resources in a mobile communication system, the method comprising the steps of, at the user agent receiving a downlink communication via a physical downlink control channel (PDCCH), using a semi persistent scheduling radio temporary network identifier (SPS-RNTI) assigned to the device to decode a control message on physical downlink control channel (PDCCH) which may include downlink control information (DCI) in a plurality of DCI fields arranged in a DCI format and where the data from the at least one of the DCI fields is identical to a fixed SPS release value, releasing at least one of the uplink and down link semi-persistent communication resources.

26 Claims, 12 Drawing Sheets

SEMI-PERSISTENT RESOURCE RELEASE BY WIRELESS COMMUNICATION DEVICE

This application claims priority to U.S. provisional application No. 61/138,323 which was filed on Dec. 17, 2008 which has the same title as the present application and which is incorporated herein by reference in its entirety.

BACKGROUND

The present invention relates generally to wireless communication devices and more specifically to a method and apparatus for causing a wireless communication device to release semi-persistent uplink and/or downlink communication resources.

As used herein, the terms "user agent" and "UA" can refer to wireless devices such as mobile telephones, personal digital assistants, handheld or laptop computers, and similar devices that have telecommunications capabilities. In some embodiments, a UA may refer to a mobile, wireless device. The term "UA" may also refer to devices that have similar capabilities but that are not transportable, such as desktop computers, set-top boxes, or network nodes.

In traditional wireless telecommunications systems, transmission equipment in a base station or access device transmits signals throughout a geographical region known as a cell. As technology has evolved, more advanced equipment has been introduced that can provide services that were not possible previously. This advanced equipment might include, for example, an E-UTRAN (evolved universal terrestrial radio access network) node B (eNB), a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). As used herein, the term "access device" will refer to any component, such as a traditional base station or an LTE eNB (Evolved Node B), that can provide a UA with access to other components in a telecommunications system.

In mobile communication systems such as the E-UTRAN, the access device provides radio accesses to one or more UAs. The access device comprises a packet scheduler for allocating uplink and downlink data transmission resources among all the UAs communicating with the access device. The functions of the scheduler include, among others, dividing the available air interface capacity between the UAs, deciding the resources (e.g. sub-carrier frequencies and timing) to be used for each UA's packet data transmission, and monitoring packet allocation and system load. The scheduler allocates physical layer resources for downlink shared channel (PD-SCH) and uplink shared channel (PUSCH) data transmissions, and sends scheduling information to the UAs through a physical downlink control channel (PDCCH). The UAs refer to the scheduling information for the timing, frequency, data block size, modulation and coding of uplink and downlink transmissions.

Several different data control information (DCI) message formats are used to communicate resource assignments to UAs including, among others, a DCI format 0 for specifying uplink resources and DCI formats 1, 1A, 2 and 2A for specifying downlink resources. Uplink specifying DCI format 0 includes several DCI fields, each of which includes information for specifying a different aspect of allocated uplink resources. Exemplary DCI format 0 DCI fields include a transmit power control (TPC) field, a cyclic shift demodulation reference signal (DM-RS) field, a modulating coding scheme (MCS) and redundancy version field, a New Data Indicator (NDI) field, a resource block assignment field and a hopping flag field. The downlink specifying DCI formats 1, 1A, 2 and 2A each include several DCI fields that include information for specifying different aspects of allocated downlink resources. Exemplary DCI format 1, 1A, 2 and 2A DCI fields include a HARQ process number field, an MCS field, a New Data Indicator (NDI) field, a resource block assignment field and a redundancy version field. Each of the DCI formats 0, 1, 2, 1A and 2A includes additional fields for specifying allocated resources. The access device selects one of the downlink DCI formats for allocating resources to a UA as a function of several factors including UA and access device capabilities, the amount of data a UA has to transmit, the amount of communication traffic within a cell, etc.

After a DCI formatted massage is generated, an access device may generate a cyclic redundancy check (CRC) for the message and append the CRC to the DCI formatted message. Next, the access device may use a Cell-Radio Network Terminal Identifier (C-RNTI) or Semi-Persistent Scheduling Radio Network Terminal Identifier (SPS-RNTI) that is uniquely associated with a UA to scramble the CRC prior to transmitting the message to the UA. When the message is received at the UA, the UA calculates the CRC from the received message, uses the C-RNTI or SPS-RNTI to scramble the CRC and uses the scrambled CRC to ascertain if the message was received accurately. If the CRC check indicates that the message was not intended for the UA (i.e. the CRC derived at the UA does not match to the CRC attached to the received message), the UA ignores the message.

Whenever control information has to be transmitted between an access device and a UA, the resources required to complete that transmission cannot be used to transmit other information such as voice or application information. For this reason the communications industry is always searching for ways to reduce the amount of control data required for controlling communications.

Two general types communication scheduling include persistent and semi-persistent. In persistent scheduling, as the label implies, communication resources are pre-allocated for a specific UA until released regardless of whether or not the resources remain in use during an entire scheduled period. For simple persistent scheduling this means that persistently scheduled resources are not available to other UAs for communication even when a UA that the persistent resource is assigned to is not using the resource.

In semi-persistent scheduling, a resource is assigned to a UA and is used on an on-going basis until the access device decides to stop using the resource and instructs the UA to stop using the resource. Thus, for instance, in the case of Voice over Internet Protocol (VoIP), a typical communication sequence may include interleaved "talk spurt states" and "silence states" where data corresponding to a UA user's speech is communicated during talk spurt states and no data except comfort noise information is communicated during silence states. During times of UA inactivity (e.g., silence states), the allocated uplink and downlink resources associated with a UA may be released so that the resources can be allocated to other UAs. Here, the uplink and downlink resources are persistently allocated in the sense that the resources remain allocated at long as the resources are being actively used to communicate information. Once resource use ceases, the resources are released. After resources are released, when a next talk spurt is to occur, the access device transmits one or more additional DCI formatted messages to the UA to commence a new SPS resource allocation to support the next spurt. Hereafter the phrase "SPS resources" will be used to refer to resources that are semi-persistently scheduled. In order to control SPS resource assignment, SPS-RNTI is used.

In the case of SPS resources, the communication industry has settled on ways to reliably activate and reconfigure SPS resources. Unfortunately, the industry has not developed a reliable way to cause a UA to release SPS resources.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
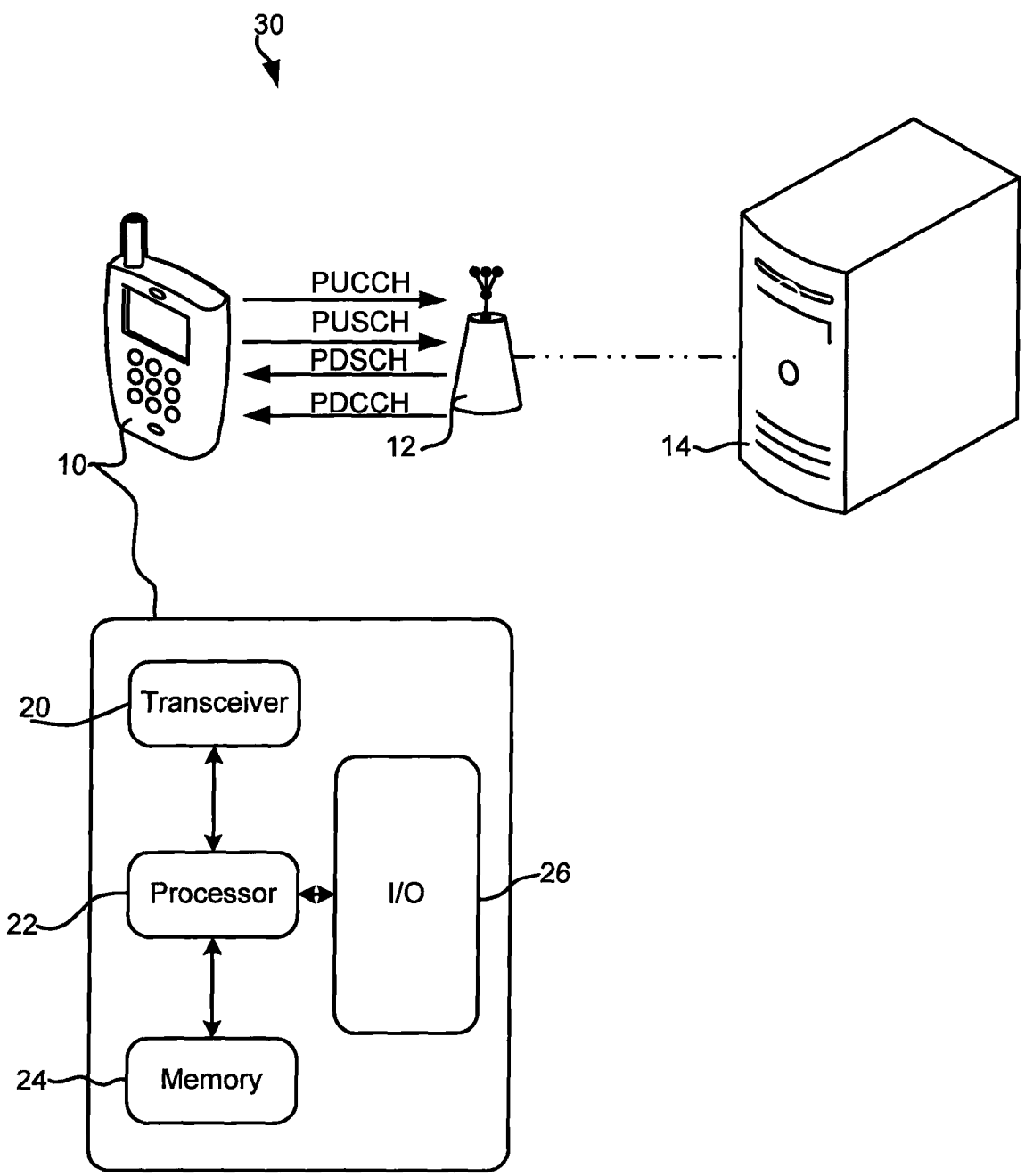
FIG. 1 is an illustration of a wireless communications system including a user agent (UA), an access device and a server.

It has been recognized that a special SPS value can be included in a plurality of DCI formatted message fields where a UA can be programmed to recognize the DCI field value as an SPS resource release value or indication for uplink resources, downlink resources or both uplink and downlink resources. For instance, in at least some embodiments, a resource block assignment field in a DCI formatted message may be set to all zeros. Here, upon receiving and recognizing a DCI formatted message intended for a UA, the UA may determine that the resource block assignment DCI field is set to all zeros thereby indicating that no resources are to be assigned to the UA and therefore that both currently allocated uplink and downlink resources should be released. To make reception of SPS release value more reliable, the SPS release value may include data in other DCI format fields and the UA may also be programmed to check other DCI fields for data that indicates that the SPS resources should be released.

Consistent with the above comments, at least some embodiments include a method for causing a user agent to release at least one of uplink and downlink semi-persistent communication resources in a mobile communication system including an access device, the method comprising the steps of, at the user agent, receiving a downlink communication from the access device via a physical downlink control channel (PDCCH), using a semi persistent scheduling radio temporary network identifier (SPS-RNTI) assigned to the device to decode a control message on physical downlink control channel (PDCCH) which may include downlink control information (DCI) in a plurality of DCI fields arranged in a DCI format, comparing data from at least one of the DCI fields to a fixed semi-persistent scheduling (SPS) release value and where the data from the at least one of the DCI fields is identical to the fixed SPS release value, releasing at least one of the uplink and down link semi-persistent communication resources.

In some cases one of the DCI fields includes a resource block assignment field and wherein the step of comparing data from at least one of the DCI fields includes comparing data from the resource block assignment field. In some cases the SPS release value is set to a fixed value. In some cases the step of comparing data from at least one of the DCI fields includes comparing data from each of a plurality of the DCI fields to fixed SPS release values for each of the fields and where the step of releasing communication resources includes releasing resources when the data from each of the plurality of DCI fields is identical to an associated fixed SPS value.

In some embodiments at least one of the DCI fields includes at least a resource block assignment field, a transmit power control (TPC) command field, a cyclic shift demodulation reference signal (DM RS) field, a modulation and coding scheme (MCS) and redundancy version field and a new data indicator (NDI) field. In some cases, when the DCI format is DCI format 0, the step of comparing data from at least a DCI field to an associated SPS value includes comparing data from each of a TPC command field, a cyclic shift DM RS field, an MCS and redundancy version field, an NDI field. In some cases the SPS release values for the MCS and redundancy field, the NDI field are 11111 and zero, respectively.

In some embodiments, when the DCI format is one of a DCI format 1, DCI format 1A, DCI format 2 and DCI format 2A, the at least a DCI field is at least one of a HARQ process number field, a modulation and coding scheme (MCS) field, a redundancy version field and a new data indicator (NDI) field. In some cases, when the DCI format is one of a DCI format 1, DCI format 1A, DCI format 2 and DCI format 2A, the step of comparing data from at least a DCI field to an associated SPS value includes comparing data from each of a HARQ process number field, a modulation and coding scheme (MCS) field, a redundancy version field and a new data indicator (NDI) field. In some cases the SPS release values for the HARQ process number field is set to a fixed value.

In some cases the SPS release value for the MCS field includes all 1's where the DCI format is 1A. In some cases the SPS release value for the redundancy version field is set to a fixed value where the DCI format is one of 1 and 1A and includes an enabled transport block set to 11 where the DCI format is one of 2 and 2A. In some cases the SPS release value includes a resource block assignment field value, only a subset of possible resource block assignment field values are used to indicate resource assignment and wherein the SPS release value includes a resource block assignment field value other than one of the values in the subset. In some cases the step of releasing includes releasing when the data from all of the DCI fields is identical to the fixed SPS release value.

Other embodiments include a method for causing a user agent to validate deactivation of at least one of an uplink and downlink semi-persistent communication resource in a mobile communication system including an access device, the method comprising the steps of, at the user agent, receiving a downlink communication from the access device via a physical downlink control channel (PDCCH), using a semi persistent scheduling radio temporary network identifier (SPS-RNTI) assigned to the device to decode a control message on physical downlink control channel (PDCCH) which may include downlink control information (DCI) in a plurality of DCI fields arranged in a DCI format, verifying that data from at least one of the DCI fields matches an SPS release value and, where verification is unsuccessful, considering the received message as having been received with a non-matching CRC.

Still other embodiments include an apparatus for causing a user agent to release at least one of uplink and downlink semi-persistent communication resources in a mobile communication system including an access device, the apparatus comprising a processor configured to perform the steps of, receiving a downlink communication from the access device via a physical downlink control channel (PDCCH), using a semi persistent scheduling radio temporary network identifier (SPS-RNTI) assigned to the device to decode a control message on physical downlink control channel (PDCCH) which may include downlink control information (DCI) in a plurality of DCI fields arranged in a DCI format, comparing data from at least one of the DCI fields to a fixed semi-persistent scheduling (SPS) release value and where the data from the at least one of the DCI fields is identical to the fixed SPS release value, releasing at least one of the uplink and down link semi-persistent communication resources.

In some cases one of the DCI fields includes a resource block assignment field and wherein the processor performs the step of comparing data from at least one of the DCI fields by comparing data from the resource block assignment field. In some cases the SPS release value is set to a fixed value. In some cases the processor performs the step of comparing data from at least one of the DCI fields by comparing data from each of a plurality of the DCI fields to fixed SPS release values for each of the fields and where the step of releasing communication resources includes releasing resources when the data from each of the plurality of DCI fields is identical to an associated fixed SPS value.

In some cases at least one of the DCI fields includes at least a resource block assignment field, a transmit power control (TPC) command field, a cyclic shift demodulation reference signal (DM RS) field, a modulation and coding scheme (MCS) and redundancy version field and a new data indicator field. In some embodiments, when the DCI format is DCI format 0, the processor performs the step of comparing data from at least a DCI field to an associated SPS value by comparing data from each of a TPC command field, a cyclic shift DM RS field, an MCS and redundancy version field and an NDI field. In some cases the SPS release values for the MCS and redundancy field and the NDI field are 11111 and zero, respectively. In some cases, when the DCI format is one of a DCI format 1, DCI format 1A, DCI format 2 and DCI format 2A, the at least a second DCI field is at least one of a HARQ process number field, a modulation and coding scheme (MCS) field, a redundancy version field and a new data indicator (NDI) field.

In some embodiments, when the DCI format is one of a DCI format 1, DCI format 1A, DCI format 2 and DCI format 2A, the processor performs the step of comparing data from at least a DCI field to an associated SPS value by comparing data from each of a HARQ process number field, a modulation and coding scheme (MCS) field, a redundancy version field and a new data indicator (NDI) field. In some embodiments the SPS release value for the HARQ process number field is set to a fixed value. In some embodiments the SPS release value for the MCS field includes all 1's where the DCI format is 1A.

In some cases the SPS release value for the redundancy version field is set to a fixed value where the DCI format is one of 1 and 1A and includes an enabled transport block set to 11 where the DCI format is one of 2 and 2A. In some embodiments the SPS release value includes a resource block assignment field value, only a subset of possible resource block assignment field values are used to indicate resource assignment and wherein the SPS release value includes a resource block assignment field value other than one of the values in the subset. In some embodiments the processor performs the step of releasing by releasing when the data from all of the DCI fields is identical to the fixed SPS release value.

Yet other embodiments include an apparatus for causing a user agent to validate deactivation of at least one of an uplink and downlink semi-persistent communication resource in a mobile communication system including an access device, the apparatus comprising the steps of, at the user agent, using a processor to perform the steps of, receiving a downlink communication from the access device via a physical downlink control channel (PDCCH), using a semi persistent scheduling radio temporary network identifier (SPS-RNTI) assigned to the device to decode a control message on physical downlink control channel (PDCCH) which may include downlink control information (DCI) in a plurality of DCI fields arranged in a DCI format, verifying that data from at least one of the DCI fields matches an SPS release value; and where verification is unsuccessful, considering the received message as having been received with a non-matching CRC.

Some embodiments include a method for causing a user agent to release at least one of uplink and downlink semi-persistent communication resources in a mobile communication system, the method comprising the steps of, at the user agent, receiving a downlink communication via a physical downlink control channel (PDCCH), using a semi persistent scheduling radio temporary network identifier (SPS-RNTI) assigned to the device to decode a control message on physical downlink control channel (PDCCH) which may include downlink control information (DCI) in a plurality of DCI fields arranged in a DCI format and, where the data from the at least one of the DCI fields is identical to a fixed SPS release value, releasing at least one of the uplink and down link semi-persistent communication resources.

In some cases one of the DCI fields includes a resource block assignment field. In some cases the SPS release value is set to a fixed value. In some cases the step of releasing communication resources includes releasing resources when the data from each of the plurality of DCI fields is identical to an associated fixed SPS value. In some cases at least one of the DCI fields includes at least a resource block assignment field, a transmit power control (TPC) command field, a cyclic shift demodulation reference signal (DM RS) field, a modulation and coding scheme (MCS) and redundancy version field.

In some cases, when the DCI format is DCI format 0, the at least a DCI field is at least one of a TPC command field, a cyclic shift DM RS field, an MCS and redundancy version field. In some cases the SPS release values for the MCS and redundancy field, the NDI field are 11111 and zero, respectively. In some cases, when the DCI format is one of a DCI format 1, DCI format 1A, DCI format 2 and DCI format 2A, the at least a DCI field is at least one of a HARQ process number field, a modulation and coding scheme (MCS) field, a redundancy version field and a new data indicator (NDI) field. In some cases the SPS release values for the HARQ process number field is set to a fixed value.

In some cases the SPS release value for the MCS field includes all 1's where the DCI format is 1A. In some cases the SPS release value for the redundancy version field is set to a fixed value where the DCI format is one of 1 and 1A. In some cases the SPS release value includes a resource block assignment field value, only a subset of possible resource block assignment field values are used to indicate resource assignment and wherein the SPS release value includes a resource block assignment field value other than one of the values in the subset. In some cases the step of releasing includes releasing when the data from all of the DCI fields is identical to the fixed SPS release value.

In some embodiments a user agent to validate deactivation of at least one of an uplink and downlink semi-persistent communication resource in a mobile communication system, the method comprising the steps of, at the user agent, receiving a downlink communication via a physical downlink control channel (PDCCH), using a semi persistent scheduling radio temporary network identifier (SPS-RNTI) assigned to the device to decode a control message on physical downlink control channel (PDCCH) which may include downlink control information (DCI) in a plurality of DCI fields arranged in a DCI format, verifying that data from at least one of the DCI fields matches an SPS release value, where verification is unsuccessful, considering the received message as having been received with a non-matching CRC.

Some embodiments include an apparatus for causing a user agent to release at least one of uplink and downlink semi-persistent communication resources in a mobile communication system, the apparatus comprising a processor configured to perform the steps of, receiving a downlink communication via a physical downlink control channel (PDCCH), using a semi persistent scheduling radio temporary network identifier (SPS-RNTI) assigned to the device to decode a control message on physical downlink control channel (PDCCH) which may include downlink control information (DCI) in a plurality of DCI fields arranged in a DCI format and where the data from the at least one of the DCI fields is identical to a fixed SPS release value, releasing at least one of the uplink and down link semi-persistent communication resources.

In some cases one of the DCI fields includes a resource block assignment field. In some cases the SPS release value is set to a fixed value. In some cases the processor performs the step of releasing communication resources by releasing resources when the data from each of the plurality of DCI fields is identical to an associated fixed SPS value. In some cases at least one of the DCI fields includes at least a resource block assignment field, a transmit power control (TPC) command field, a cyclic shift demodulation reference signal (DM RS) field, a modulation and coding scheme (MCS) and redundancy version field and a new data indicator field. In some cases, when the DCI format is DCI format 0, the at least a DCI field is at least one of a TPC command field, a cyclic shift DM RS field, and an MCS and redundancy version field.

In some cases the SPS release values for the MCS and redundancy field and the NDI field are 11111 and zero, respectively. In some cases, when the DCI format is one of a DCI format 1, DCI format 1A, DCI format 2 and DCI format 2A, the at least a second DCI field is at least one of a HARQ process number field, a modulation and coding scheme (MCS) field, a redundancy version field and a new data indicator (NDI) field. In some cases the SPS release value for the HARQ process number field is set to a fixed value. In some cases the SPS release value for the MCS field includes all 1's where the DCI format is 1A.

In some cases the SPS release value for the redundancy version field is set to a fixed value where the DCI format is one of 1 and 1A and includes an enabled transport block set to 11 where the DCI format is one of 2 and 2A. In some cases the SPS release value includes a resource block assignment field value, only a subset of possible resource block assignment field values are used to indicate resource assignment and wherein the SPS release value includes a resource block assignment field value other than one of the values in the subset. In some cases the processor performs the step of releasing by releasing when the data from all of the DCI fields is identical to the fixed SPS release value.

Still other embodiments include an apparatus for causing a user agent to validate deactivation of at least one of an uplink and downlink semi-persistent communication resource in a mobile communication system, the apparatus comprising the steps of, at the user agent, using a processor to perform the steps of receiving a downlink communication via a physical downlink control channel (PDCCH), using a semi persistent scheduling radio temporary network identifier (SPS-RNTI) assigned to the device to decode a control message on physical downlink control channel (PDCCH) which may include downlink control information (DCI) in a plurality of DCI fields arranged in a DCI format, verifying that data from at least one of the DCI fields matches an SPS release value and where verification is unsuccessful, considering the received message as having been received with a non-matching CRC.

To the accomplishment of the foregoing and related ends, the disclosure, then, comprises the features hereinafter fully described. The following description and the annexed drawings set forth in detail certain illustrative aspects of the invention. However, these aspects are indicative of but a few of the various ways in which the principles of the disclosure can be employed. Other aspects, advantages and novel features of the disclosure will become apparent from the following detailed description of the disclosure when considered in conjunction with the drawings.

The various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Referring now to the drawings wherein like reference numerals correspond to similar elements throughout the several views and, more specifically, referring to FIG. 1, FIG. 1 illustrates a communication system that includes a user agent (UA) 10, an access device 12 and a server 14. UA 10 includes a processor 22, a transceiver 20, a memory 24 and input/output devices collectively identified by numeral 26. UA 10 may include other components and an exemplary more detailed UA is described hereafter in relation to FIGS. 10 and 11. Memory 24 stores programs that are run by processor to perform various communication functions including the functions that are described herein and that comprise the present disclosure. I/O 26 may include a display screen, a microphone, a speaker, input keys on a phone or portable computer, etc.

UA 10 communicates with access device 12 (i.e., an evolved Node B (eNB)) via various uplink and downlink communication channels. While UAs and access devices use many different channels to facilitate communications, in order to simplify this explanation only four channels are illustrated including a physical downlink control channel (PDCCH), a physical uplink control channel (PUCCH), a physical downlink shared channel (PDSCH) and a physical uplink shared channel (PUSCH).

Access device 12 hosts a plurality of functions including but not limited to radio resource management including radio bearer control, radio admission control, connection mobility control, dynamic allocation of resources to UAs in both uplink and downlink (scheduling); IP header compression and encryption of user data stream; scheduling and transmission of broadcast information and measurement and measurement reporting configuration for mobility and scheduling.

Referring still to FIG. 1, in at least some embodiments of the disclosure, access device 12 is programmed to take steps to release semi-persistent scheduled or scheduling (SPS) communication resources for any of several different reasons. For instance, in some cases a UA 10 data buffer may run out of data to be transmitted to access device 12 so that communication resources assigned to UA 10 are not needed and can be released for other purposes.

Where some event occurs that causes access device 12 to recognize that a UA should release SPS resources, consistent with at least some embodiments of the present disclosure, access device 12 may be programmed to generate a message or data packet to be transmitted to UA 10 that will be recognized by the UA as a signal that the UA 10 should release the SPS resources. In at least some embodiments, a message that is usually used to allocate resources to a UA may be used to indicate that the already allocated SPS resources should be released. For instance, in at least some embodiments, the SPS release packet may take the form of a DCI formatted message and a plurality of DCI fields may be populated with a specific value recognizable by UA 10 as an indication that the SPS resources should be released. The SPS release value will depend on the DCI format used to form the message.

There are several different DCI formats used routinely in communication protocols. For the purposes of this disclosure, the important DCI formats include DCI format 0, DCI format 1, DCI format 1A, DCI format 2 and DCI format 2A. DCI format 0 is typically used for the scheduling of PUSCH, DCI format 1 is typically used for the scheduling of one PDSCH codeword, DCI format 1A is typically used for the compact scheduling of one PDSCH codeword and DCI formats 2 and 2A are typically used for scheduling PDSCH to UAs configured in a spatial multiplexing mode. According to 3GPP TS 36.212, sub-clauses 5.3.3.1.1-5.3.3.2.5, DCI formats 0, 1, 2, 1A and 2A include, among other fields, the fields shown in Table 1 below.

TABLE 1

| DCI Format | Format Fields |
| --- | --- |
| DCI format 0 | Resource Block Assignment Field (variable # bits) <br> New data Indicator (NDI) <br> TPC command for scheduled PUSCH <br> Cyclic shift DM RS <br> Modulation and coding scheme (MCS) and redundancy version <br> Hopping Flag |
| DCI format 1, 2 and 2A | Resource Block Assignment Field (variable # bits) <br> New data Indicator (NDI) <br> HARQ process number <br> Modulation and coding scheme (MCS) <br> Redundancy Version <br> Resource Allocation Type |
| DCI format 1A | Resource Block Assignment Field (variable # bits) <br> New data Indicator (NDI) <br> HARQ process number <br> Modulation and coding scheme (MCS) <br> Redundancy Version <br> Localized/Distributed VRB Assignment flag |

In some embodiments the SPS release value or SPS release value or values (i.e., the combined data that comprises the release value) may include data associated with each of the DCI format fields shown in Table 1 above for a specific DCI format. Thus, for instance, where a DCI format 0 message is used to signal uplink SPS resource release to a UA, the SPS release value may include data in each of the TPC field, the DM-RS field, the MCS and redundancy version field, the NDI field, the hopping flag field and the resource block assignment field. In other embodiments it is contemplated that a subset of the fields (e.g., only the TPC field and the resource block assignment field in the case of the DCI format 0) described above may be used to indicate SPS release.

As indicated above, in at least some embodiments an SPS release indication will cause a UA to release each of uplink and downlink resources. In other embodiments an SPS release indication may only cause the UA to release uplink SPS resources or downlink SPS resources. In still other embodiments it is contemplated that different DCI format field values may be used to cause a UA to release uplink SPS resources, downlink SPS resources or both uplink and downlink SPS resources. Hereafter, in the interest of simplifying this explanation, unless indicated otherwise, a system will be described wherein the exemplary SPS release value causes UA 10 to only release uplink resources.

Figure 2:
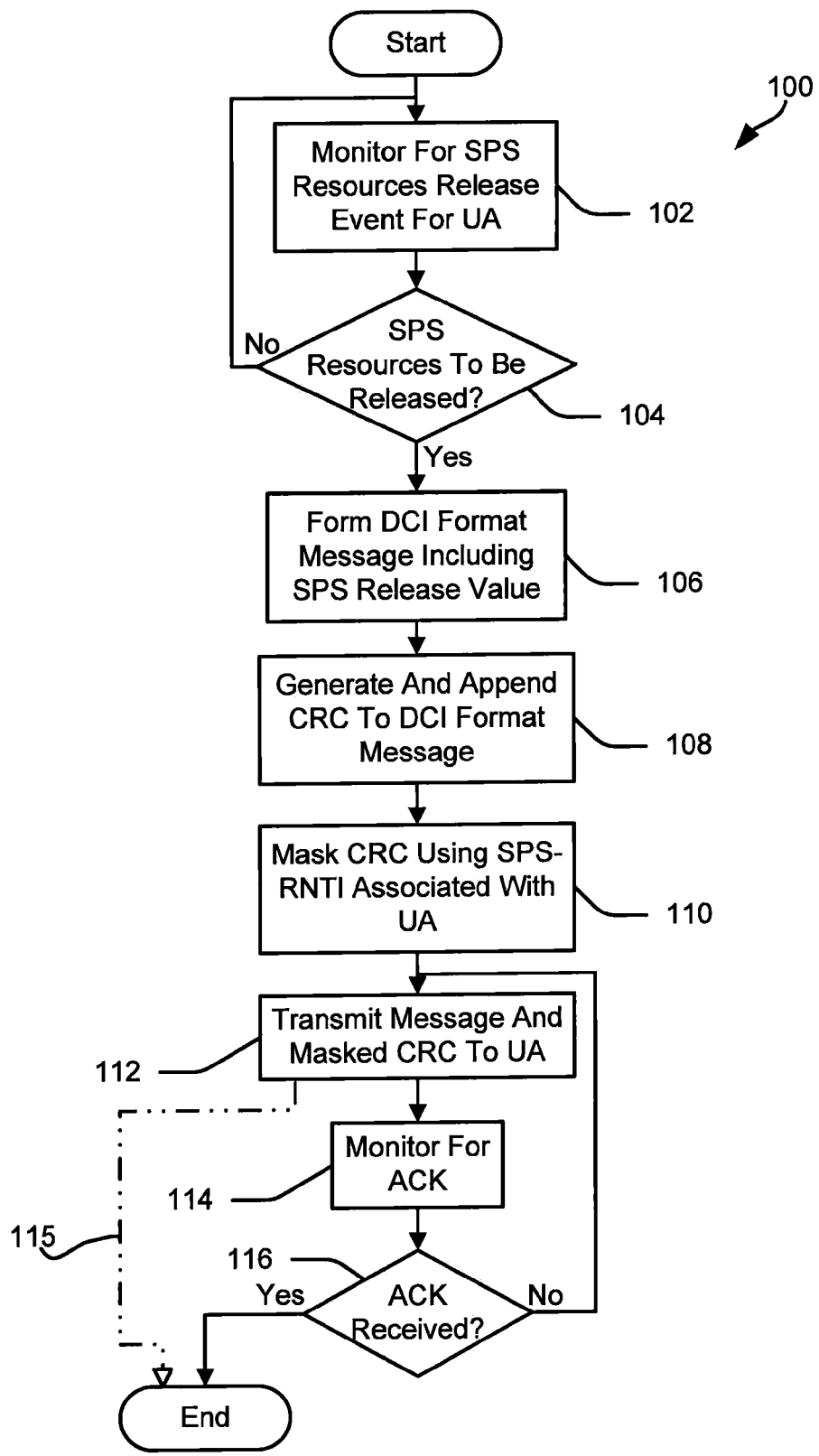
FIG. 2 is an illustration of a method whereby an access device generates a SPS release value in a DCI formatted message.

Referring now to FIG. 2, an exemplary process 100 is illustrated that may be performed by a processor associated with access device 12 where the process 100 is consistent with at least some aspects of the present disclosure. Referring also to FIG. 1, at block 102, access device 12 monitors information associated with system 30 to determine whether or not an SPS resource release event has occurred for UA 10. Here, a release event may take any of several different forms. For instance, one type of release event may be that UA 10 runs out of data to transmit to access device 12. Here, in some cases UA 10 may indicate no data to transmit or, in the alternative, access device 12 may simply recognize that UA 10 has stopped transmitting data. At block 104, where SPS resources are to be released because a release event has occurred, control passes to process block 106.

At process block 106, access device 12 forms a DCI format message that includes an SPS release value. Referring to Table 2 hereafter, exemplary SPS release values for each of the DCI format 0, DCI format 1, DCI format 1A, DCI format 2 and DCI format 2A are illustrated. As shown, in at least some embodiments, each of the six DCI format 0 fields shown in the table are used to specify an SPS release value. Similarly, six DCI fields are used to specify an SPS release value for each of the DCI formats 1, 1A, 2 and 2A. As shown, the set of six fields used to indicate an SPS release value are different depending upon which DCI format is used to indicate release. Each of the DCI formats uses the resource block assignment field and the new data indicator field as two of the six DCI fields for indicating the SPS release value. As shown, regardless of the DCI format used, the SPS release value in the illustrated embodiment includes a resource block assignment field which is set to all "0's" and the new data indicator field that is set to zero.

Referring still to Table 2 below, the other four DCI fields used to specify an SPS release value when DCI format 0 is used include the TPC command for scheduled PUSCH field, the cyclic shift DM-RS field, the modulation and coding scheme and redundancy version field and the hopping flag field. In the illustrated embodiment, the TPC command for scheduled PUSCH field is set to "11", the cyclic shift DM-RS field is set to "111", the modulation and coding scheme and redundancy version field is set to "11111" and the hopping flag field is set to "0".

Referring still to Table 2, where either DCI format 1 or 1A is used to indicate an SPS release, in addition to the resource block assignment field and the NDI field, other fields used to define the SPS release value include the HARQ process number field, the modulation and coding scheme field and the redundancy version field where the HARQ process number field is set to either "111", (e.g., for the frequency division duplex (FDD) case) or "1111" (e.g., for the time division duplex (TDD) case), the modulation and coding scheme field is set to "11111" and the redundancy version field is set to "11". In the case a DCI format 1 SPS release, the sixth DCI field used to define the SPS release value includes the resource allocation type field or header which is set equal to type 0. In the case of a DCI format 1A SPS release, the sixth field used to define the SPS release value includes the localized VRB assignment field which is set to 0 (wherein "0" indicates localized as opposed to distributed).

Referring yet again to Table 2, for each of a DCI format 2 and DCI format 2A SPS release messages, in addition to the resource block assignment field and the NDI field, other DCI fields used to define the SPS release value include the HARQ process number field, the MCS field, the redundancy version field and the resource allocation type field. Here, as in the case of each of formats 1 and 1A, the HARQ process number field is set to either "111" (i.e., in the FDD case) or "1111" (i.e., in the TDD case), the modulation and coding scheme field enabled transport block is set to "11111", the redundancy version enables transport block is set to "11" and the resource allocation type field is set to type 0.

Referring once again to FIG. 2, after the SPS release value has been instantiated in a properly formed "DCI" formatted message at block 106, control passes to block 108 where access device 12 generates and appends a cyclic redundancy check (CRC) to the DCI format message. At block 110 the CRC is scrambled using the SPS-RNTI associated with the UA 10. At block 112, the message is transmitted to UA 10.

Next, depending on the type of SPS release (i.e., uplink or downlink), there may or may not be an acknowledge (ACK) process whereby access device 12 monitors for an ACK from UA 10 indicating that the SPS release was accurately received and processed. For instance, where the SPS release is to release semi-persistently assigned downlink resource, control passes from block 112 to block 114 where access device 12 monitors for an ACK from UA 10 indicating that the UA successfully received the message. At block 116, where no acknowledgement to a downlink SPS release is received after a time-out duration, control passes back up to block 112 where access device 12 retransmits the message to UA 10. Eventually, once an ACK is received at block 116, the process performed by access device 12 to cause the UA 10 to release the SPS resources is completed. Where the SPS release is to release a semi-persistently assigned uplink resource, after block 112 the process simply ends as indicated by the dashed control line 115 in FIG. 2.

While the embodiment described herein does not include an SPS uplink release ACK process, it is contemplated that at least some embodiments may support this feature in which case a process similar to the process described above with respect to blocks 114 and 116 would be performed.

TABLE 2

| | SPS Release Format Type | | | |
|---|---|---|---|---|
| | DCI format 0 | DCI format 1 | DCI format 1A | DCI format 2/2A |
| Resource Block Assignment Field | Set to all zeros | Set to all zeros | Set to all zeros | Set to all zeros |
| New data Indicator (NDI) | Set to "0" | Set to "0" | Set to "0" | Set to "0" |
| TPC command for scheduled PUSCH | set to "11" | N/A | N/A | N/A |
| Cyclic shift DM RS | set to "111" | N/A | N/A | N/A |
| Modulation and coding scheme (MCS) and redundancy version | Set to "11111" | N/A | N/A | N/A |
| Hopping Flag | Set to "0" | N/A | N/A | N/A |
| HARQ process number | N/A | FDD: set to "111" TDD: set to "1111" | FDD: set to "111" TDD: set to "1111" | FDD: set to "111" TDD: set to "1111" |
| Modulation and coding scheme (MCS) | N/A | Set to "11111" | Set to "11111" | For the enabled transport block: set to "11111" |
| Redundancy Version | N/A | Set to "11" | Set to "11" | For the enabled transport block: set to "11" |
| Localized VRB Assignment | N/A | N/A | Set to "1" | N/A |
| Resource Allocation Type | N/A | Type 0 Indicated | N/A | Type 0 Indicated |

Figure 3:
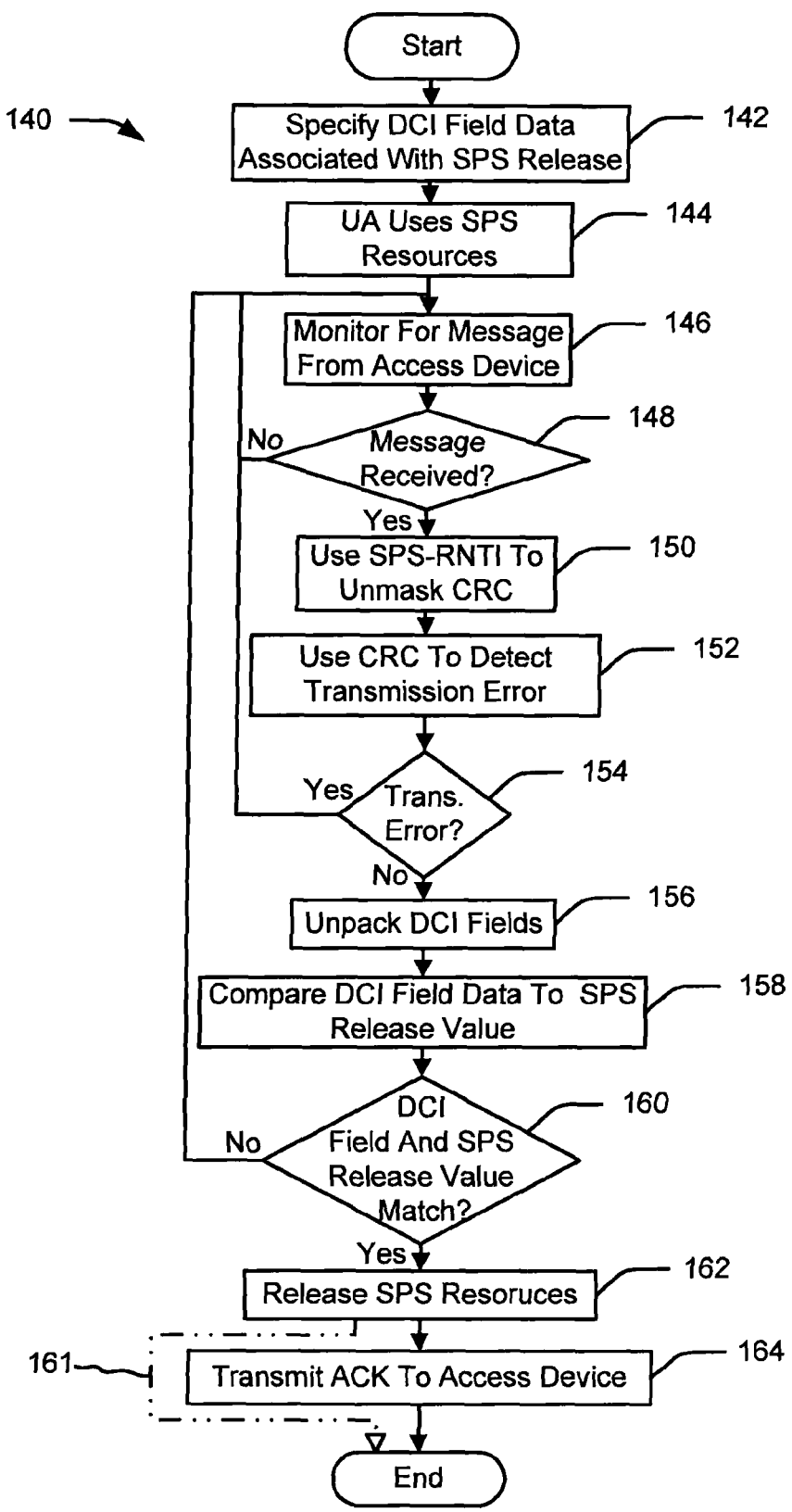
FIG. 3 is an illustration of a process by which the UA of FIG. 1 receives a DCI formatted message and determines whether or not includes a SPS release value and then releases resources when appropriate.

Referring now to FIG. 3, a process 140 performed by UA 10 (see also FIG. 1) that is consistent with at least some aspects of the present disclosure is illustrated. At process block 142, DCI format SPS release values are specified for UA 10 and stored in memory 24 (see also FIG. 1). In the present example, the values indicated in Table 2 above are specified and stored in the UA memory 24. At process block 144, UA 10 uses previously allocated uplink SPS resources in a normal fashion to communicate with access device 12.

At process block 146, UA processor 22 monitors the PDCCH for messages from access device 12. At block 148, when a message is received, control passes to block 150 where UA 10 uses the SPS-RNTI which was assigned to the UA 10 to calculate the CRC of the received message. At block 152, processor 22 identifies and uses the CRC scrambled by SPS-RNTI to detect any transmission error. At block 154, when a transmission error has occurred, control passes back up to block 146 where UA processor 22 operates as if the received message was not intended for the UA, ignores the received message and monitors for another message on the PDCCH from access device 12.

Referring still to FIGS. 1 and 3, at block 154, when no transmission error has occurred, control passes to block 156 where UA processor 22 unpacks the DCI fields. Here, consistent with Table 2, where the message is in DCI format 0, processor 22 recognizes data in each of the resource block assignment field, the NDI field, the TPC command for scheduled PUSCH field, the DM-RS field, the MCS and redundancy version field and the hopping flag field. Similarly, where the received message is in one of the other DCI formats, processor 22 unpacks the DCI fields that were used to define the SPS release value. At block 158, processor 22 compares the DCI field data to the SPS release value.

At decision block 160, where the DCI field and SPS release value do not match, processor 22 treats the received message as having been received with a non-matching CRC (i.e., as if the message was not intended for the UA) and control passes back up to block 146 where processor 22 again monitors for another message from the access device on the PDCCH. At block 160, where the DCI field data and the SPS release value match, control passes to block 162 where UA 10 releases the uplink SPS resources. Next, where the SPS release was a downlink release so that an ACK process is to be performed, control passes to block 164 where processor 22 transmits an ACK to the access device 12 acknowledging reception of the transmitted message. Where the SPS release was an uplink release, no ACK process is performed and the process ends as indicated by dashed control line 161. While the embodiment described herein does not include an SPS uplink release ACK process, it is contemplated that at least some embodiments may support this feature in which case a process similar to the process described above with respect to blocks 164 would be performed.

Figure 4:
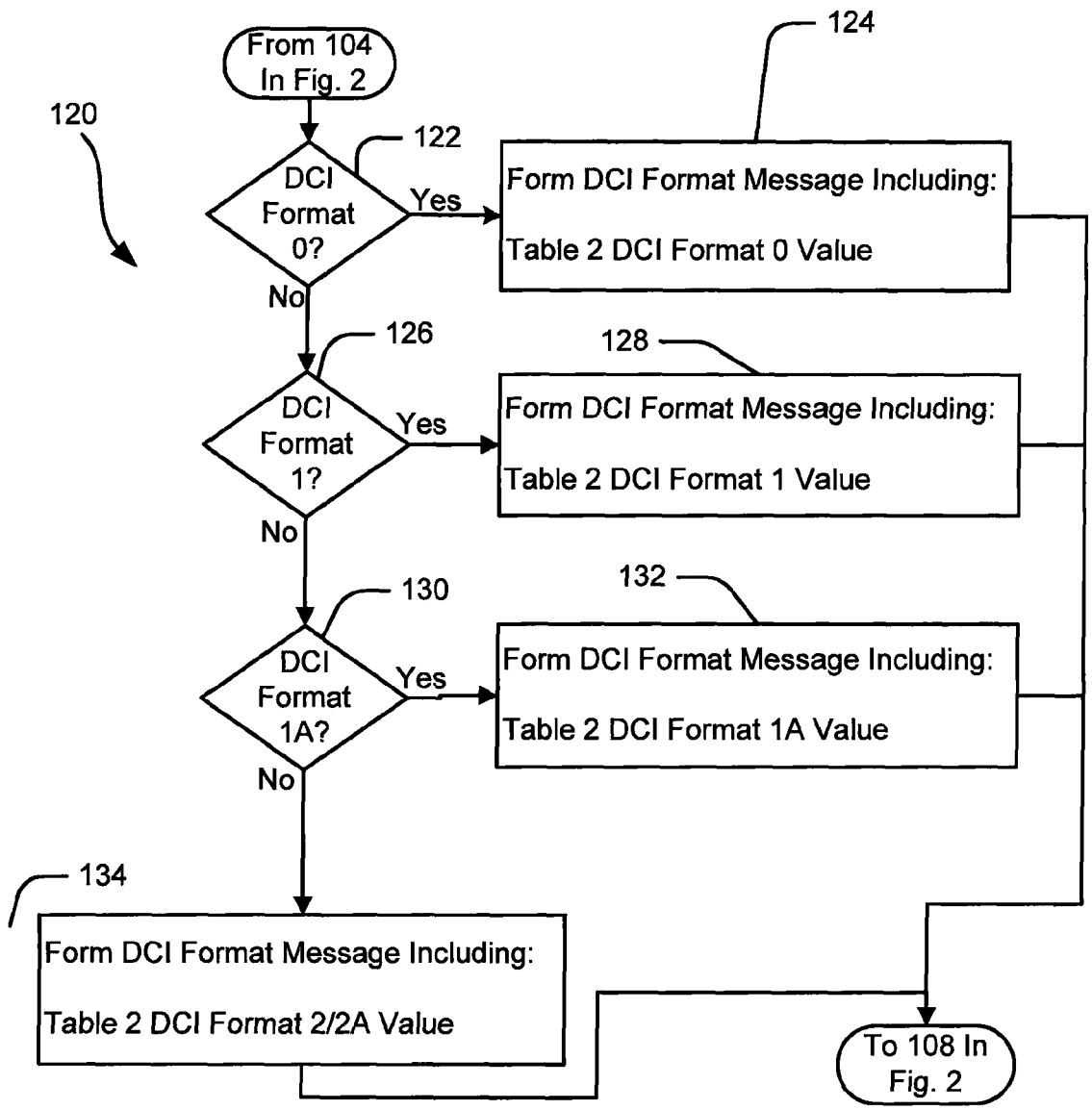
FIG. 4 is a sub-process that may be substituted for a portion of the process shown in FIG. 2, albeit where a specific SPS release value is employed.

Referring now to FIG. 4, a sub-process 120 that may be substituted for a portion of the process shown in FIG. 2 is illustrated. The sub-process 120 in FIG. 4 is consistent with the exemplary SPS release values shown in Table 2. Referring also to FIGS. 1 and 2, after decision block 104, if an SPS resource release event has occurred, control may pass from block 104 to block 122. At blocks 122, 126 and 130, an access device processor determines whether or not the DCI format is format 0, format 1, format 1A or one of the formats 2 or 2A.

Where the DCI format is format 0, control passes to block 124 where the six DCI fields indicated in Table 2 for defining the SPS release value for DCI format 0 are populated at indicated in Table 2. After block 124, control passes back to block 108 in FIG. 2 where the process described above continues.

Where the DCI format to be used to indicate SPS release is format 1, control passes to block 128 where the six fields shown in Table 2 used to define the SPS release value for a format 1 message are populated as indicated in Table 2 after which control passes to block 108 in FIG. 2.

Where the DCI format used to indicate SPS release is format 1A, control passes to block 132 where the six fields used to define the SPS release value shown in Table 2 are populated as indicated after which control passes to block 108 in FIG. 2.

Where the DCI format used to indicate SPS release is either format 2 or format 2A, control passes to block 134 where DCI fields are populated as indicated in Table 2 for formats 2/2A after which control passes to block 108 in FIG. 2.

Figure 5:
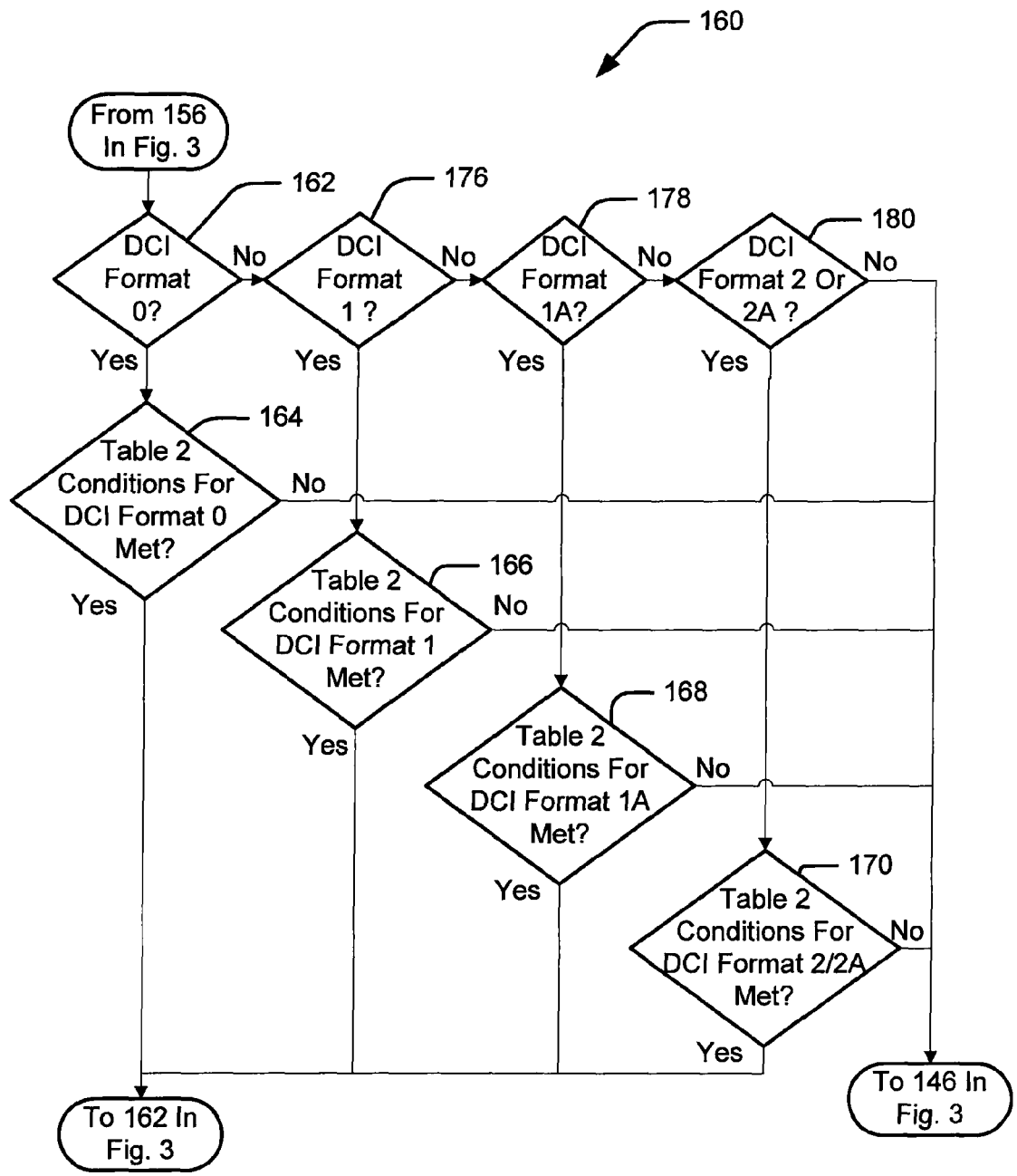
FIG. 5 is a sub-process that may be substituted for a portion of the process shown in FIG. 3.

Referring now to FIG. 5, a sub-process 160 that may be substituted for a portion of the process shown in FIG. 3 and that is consistent with the data shown in Table 2 is illustrated. Referring also to FIGS. 1 and 3, after DCI fields have been unpacked at block 156, control may pass to block 162 in FIG. 5. At blocks 162, 176, 178 and 180 UA processor 22 determines the DCI format of the message received. Where the received message is in DCI format 0, control passes to block 164 where processor 22 compares the value in the DCI formatted message to the data for DCI format 0 in Table 2 above. Where all of the conditions in Table 2 for DCI format 0 are met, control passes to block 162 in FIG. 3 where processor 22 releases the uplink SPS resources currently allocated to UA 10. Where one or more of the Table 2 conditions for DCI format 0 are not met, control passes back to block 146 in FIG. 3 where UA 10 monitors the PDCCH for another message.

Where the received message is in DCI format 1, control passes to block 166 where processor 22 compares the value in the DCI formatted message to the data for DCI format 1 in Table 2 above. Where all of the conditions in Table 2 for DCI format 1 are met, control passes to block 162 in FIG. 3 where processor 22 releases the uplink SPS resources currently allocated to UA 10. Where one or more of the Table 2 conditions for DCI format 1 are not met, control passes back to block 146 in FIG. 3 where UA 10 monitors the PDCCH for another message.

Where the received message is in DCI format 1A, control passes to block 168 where processor 22 compares the value in the DCI formatted message to the data for DCI format 1A in Table 2 above. Where all of the conditions in Table 2 for DCI format 1A are met, control passes to block 162 in FIG. 3 where processor 22 releases the uplink SPS resources currently allocated to UA 10. Where one or more of the Table 2 conditions for DCI format 1A are not met, control passes back to block 146 in FIG. 3 where UA 10 monitors the PDCCH for another message.

Where the received message is in DCI format 2 or 2A, control passes to block 170 where processor 22 compares the value in the DCI formatted message to the data for DCI format 2 or 2A in Table 2 above. Where all of the conditions in Table 2 for DCI format 2 or 2A are met, control passes to block 162 in FIG. 3 where processor 22 releases the uplink SPS resources currently allocated to UA 10. Where one or more of the Table 2 conditions for DCI format 2 or 2A are not met, control passes back to block 146 in FIG. 3 where UA 10 monitors the PDCCH for another message.

Thus, it should be appreciated that in the present disclosure a UA validates DCI format 0, 1, 1A, 2 and 2A that are received for which the CRC is scrambled by SPS-RNTI associated with the UA and where the resource block assignment field is set to all zero by verifying that all the other conditions for the respective used DCI format according to Table 2 above are met. In the case that less than all of the conditions in Table 2 are met, the received DCI format is considered by the UA to have been received with a non-matching CRC.

While the embodiment described above with respect to Table 2 and FIGS. 4 and 5 uses at least six DCI format fields to define an SPS release value, it has been recognized that other sub-values may be employed to achieve a similar function. For example, in some embodiments it may be that only the resource block assignment field and the new data indicator (NDI) field are used to define an SPS release value. For instance, in at least one embodiment the SPS release value for any of the DCI formats 0, 1, 1A, 2 and 2A may include the data for the resource block assignment field and the NDI field shown in Table 2. In this case, referring again to FIG. 4, regardless of which DCI format is used, only the first two DCI format requirements in block 124 would be set by the access device 12 when forming an SPS release message.

Figure 6:
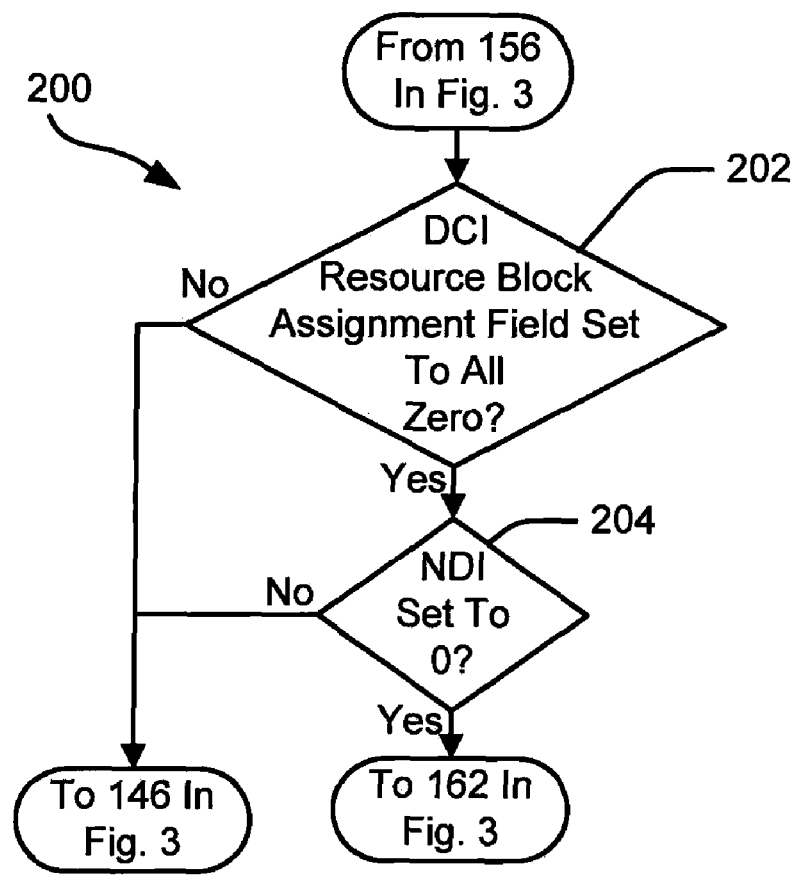
FIG. 6 is similar to FIG. 5, albeit illustrating a different sub-process that may be substituted for a portion of the process shown in FIG. 3.

Referring now to FIG. 6, a sub-process 200 that may be substituted for a portion of the process shown in FIG. 3 is illustrated where the SPS release value only includes data associated with the resource block assignment field and the NDI field of a DCI formatted message. Referring also to FIGS. 1 and 3, after DCI fields have been unpacked at block 156, control may pass to block 202 in FIG. 6 where processor 22 determines whether or not the DCI resource block assignment field has been set to all zeros. Where the condition of block 202 has not been met, control may pass to block 146 in FIG. 3. When the condition of block 202 is met, control passes to block 204 where processor 22 determines whether or not the new data indicator field includes a zero value. Where the condition of block 204 is not met, control passes to block 146 in FIG. 3. Where the condition of block 204 has been met, in this case, because the two conditions required by this embodiment have been met, control passes to block 162 where UA processor 22 releases the SPS resources.

In the embodiments described above, the resource assignment field is always set to all zeros. In the case of DCI format 1, DCI format 2 and DCI format 2A, this means that the bit map is set to all zeros for the resource block assignment field and represents a null resource block assignment. However, in the case of DCI format 0 and DCI format 1A messages, the resource block assignment is indicated by a resource indication value (RIV) as specified by 3GPP TS 36.213, sub-clauses 7.1.6.3 and 8.1. Where the RIV is zero, according to the mathematical formulas used to define the RIV in the aforementioned sub-clauses of 3GPP TS 36.213, one resource block is allocated in the lower edge of the up-link bandwidth.

In a different embodiment it is contemplated that a null resource block assignment may be indicated in DCI format 0 or format 1A messages by using a RIV number or value that cannot possibly be used by the access device 12 to indicate a resource block allocation. For instance, as known in the art, there is a maximum RIV value that can be specified given various system parameters in a DCI format 0 or 1A message. Where a maximum RIV value is 20, a resource block assignment value has to include at least five bits to indicate the maximum RIV value. Here, any RIV value over twenty will not be used to indicate a legitimate RIV value and therefore, if the five bit resource block assignment value is used to indicate a RIV value over twenty (e.g., 21, 22, 23, . . . 31), that value can be used to indicate a null resource block assignment and the UA processor 22 can be programmed to recognize the high RIV value as a null resource block assignment. Thus, there is a subset of possible RIV values but only a subset of those RIV values are every used to indicate an allocation. Here, by selecting a RIV value that is not included in the subset that is used to indicate an allocation, other signals such as an SPS release can be indicated.

Figure 7:
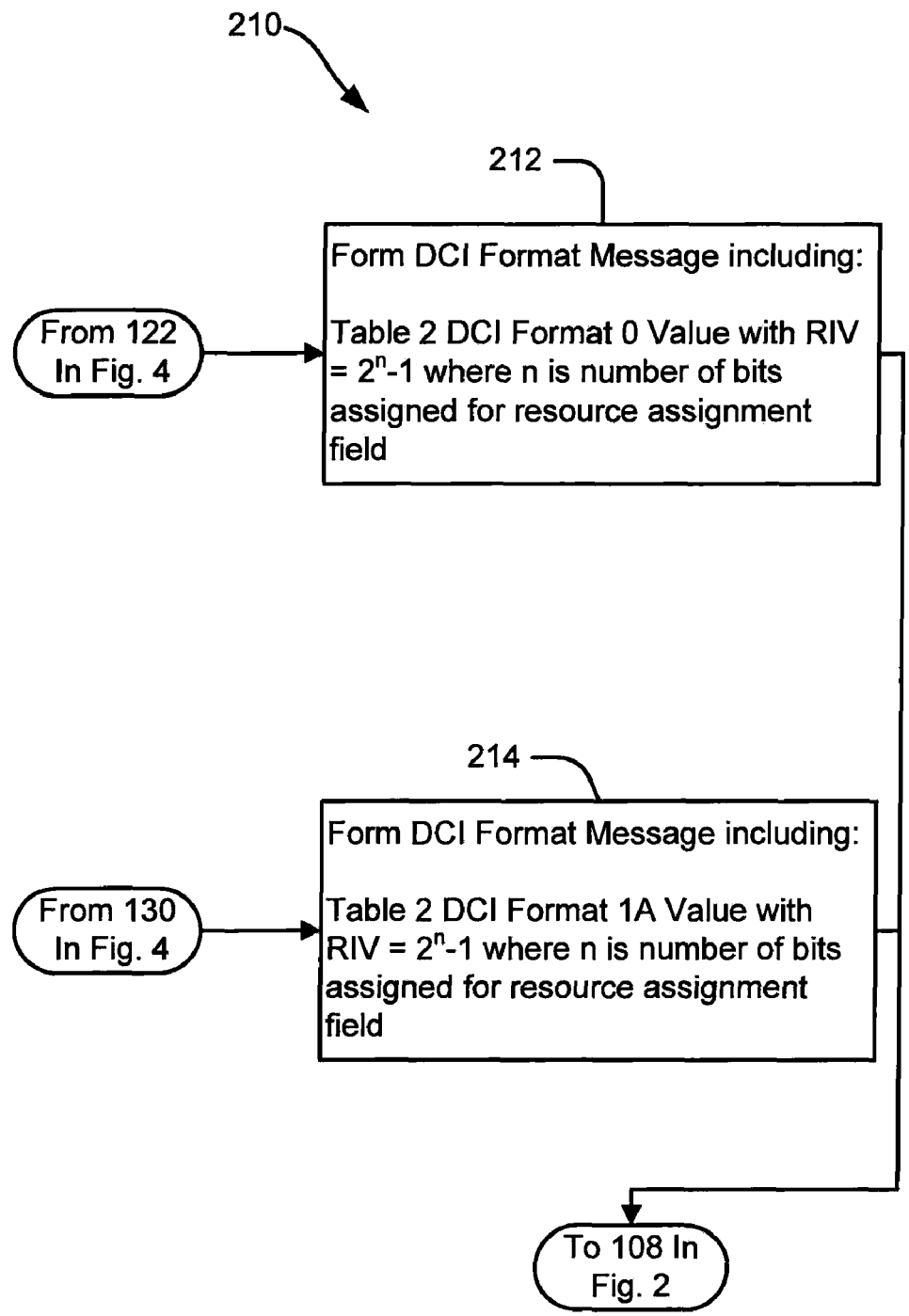
FIG. 7 is a sub-process that may be substituted for a portion of the process shown in FIG. 4.

Referring now to FIG. 7, a sub-process 210 that may be substituted for a portion of the process shown in FIG. 4 is illustrated where, for each of DCI format 0 and 1A messages, a RIV value is set equal to $2^n-1$ where n is the number of bits assigned for the resource assignment field. In this case, the resource block assignment field is not set to all zeros but instead set to all "1's" which represents $2^n-1$. Thus, referring also to FIG. 4, if the condition at block 122 is met, control may pass to block 212 in FIG. 7 where a DCI format 0 message is instantiated and the RIV value is set equal to $2^n-1$ over the resource block assignment field along with the other data for fields for DCI format 0 as indicated in Table 2 above. Similarly, if the condition of block 130 is met, control passes to block 214 in FIG. 7 where a DCI format 1A message is instantiated and the RIV value is set equal to $2^n-1$ over the resource block assignment field along with the other data for fields for DCI format 1A as indicated in Table 2 above. For instance, where n is 5, the conditions in blocks 212 and 214 would each set the RIV value to 31. After blocks 212 and 214, control passes to block 108 in FIG. 2.

Figure 8:
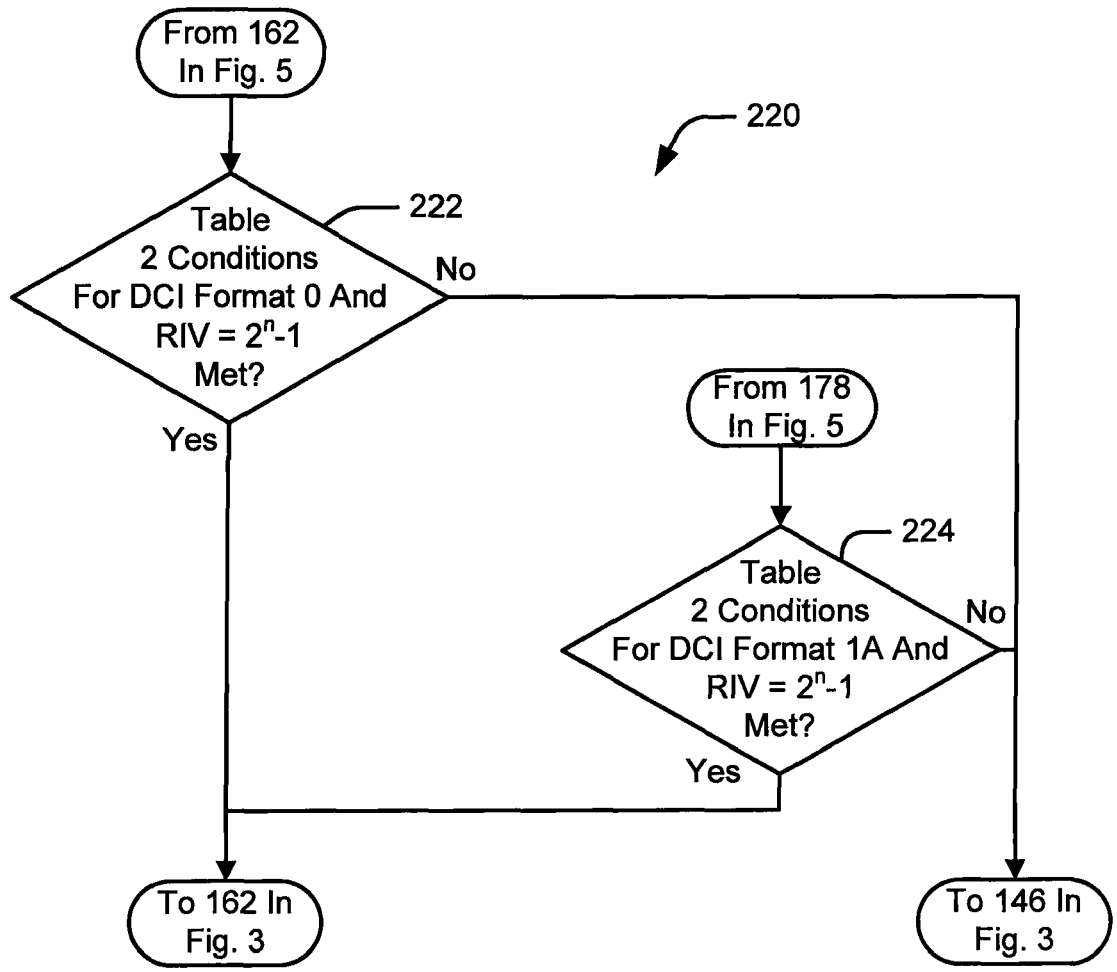
FIG. 8 is a sub-process that may be substituted for a portion of the process shown in FIG. 3.

Referring now to FIG. 8, a sub-process 220 that may be substituted for a portion of the process shown in FIG. 5 is illustrated where the sub-process 220 is consistent with the sub-process shown in FIG. 7. Referring also to FIGS. 1 and 5, where the condition of block 162 is met (i.e., the message is in DCI format 0), control may pass to block 222 in FIG. 8 where processor 22 compares the DCI value in the fields other than the resource block assignment field specified in Table 2 for DCI format 0 to the values in Table 2 and also checks to see if the RIV is set equal to $2^n-1$ for the resource block assignment field. In this case, the resource block assignment field is all "1's". Where the conditions of block 222 are met, control passes back to block 162 in FIG. 3 where the uplink SPS resources are released. Referring again to block 222, where the condition of block 222 is not met, control passes to block 146 in FIG. 3 where the described above continues.

Referring again to FIG. 5, if the condition of block 178 is met, control may pass to block 224 in FIG. 8. At block 224, processor 22 compares the DCI value in the fields other than the Resource Block Assignment Field specified in Table 2 to the values in Table 2 for DCI format 1A and also checks to see if the RIV is set equal to $2^n-1$ for the resource block assignment field. In this case, the resource block assignment field is all "1's". Where the conditions of block 224 are met, control passes back to block 162 in FIG. 3 where the uplink SPS resources are released. Referring again to block 224, where the condition of block 224 is not met, control passes to block 146 in FIG. 3 where the described above continues.

One other exemplary RIV value that is not normally used to define a resource block assignment field is where the RIV value is redefined as the current RIV definition from the TS 36.213 plus 1 which will result in a RIV 0 value meaning 0 resource block assignment. This embodiment can be implemented by slightly modifying the sub-processes shown in FIGS. 7 and 8. For instance, in blocks 212 and 214, instead of using the RIV formulas described currently in blocks 212 and 214, the RIV values can simply be redefined as the current RIV definition plus 1. In FIG. 8, instead of using a RIV condition shown in blocks 22 and 224, the UA processor 22 can determine whether or not DCI resource block assignment field RIV is set to a "0" value.

Figure 9:
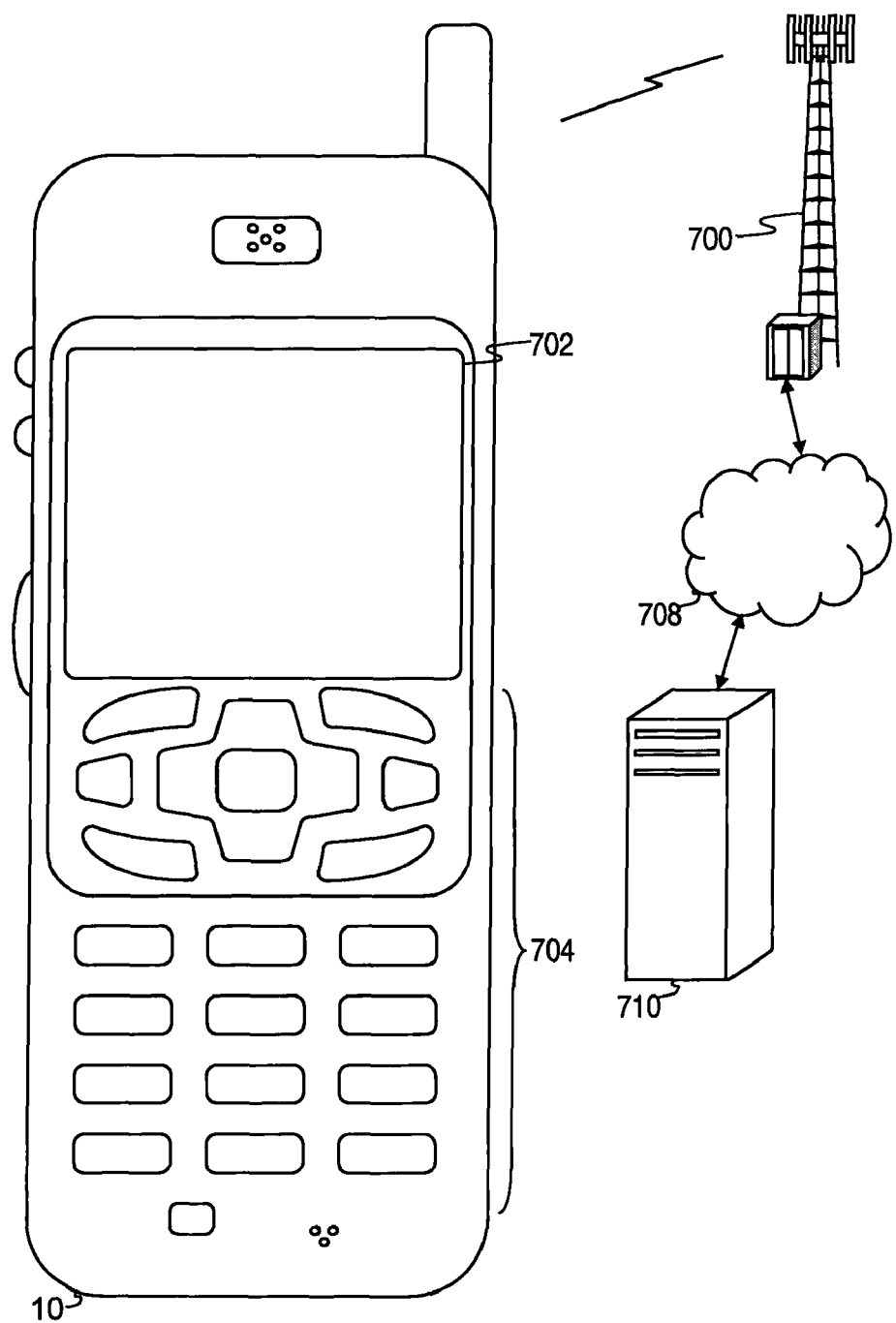
FIG. 9 is an illustration of a wireless communication system including a user agent operable for some of the various embodiments of the disclosure.

FIG. 9 illustrates a wireless communications system including an exemplary embodiment of UA 10. The UA 10 is operable for implementing aspects of the disclosure, but the disclosure should not be limited to these implementations. Though illustrated as a mobile phone, the UA 10 may take various forms including a wireless handset, a pager, a personal digital assistant (PDA), a portable computer, a tablet computer, a laptop computer. Many suitable devices combine some or all of these functions. In some embodiments of the disclosure, the UA 10 is not a general purpose computing device like a portable, laptop or tablet computer, but rather is a special-purpose communications device such as a mobile phone, a wireless handset, a pager, a PDA, or a telecommunications device installed in a vehicle. The UA 10 may also be a device, include a device, or be included in a device that has similar capabilities but that is not transportable, such as a desktop computer, a set-top box, or a network node. The UA 10 may support specialized activities such as gaming, inventory control, job control, and/or task management functions, and so on.

The UA 10 includes a display 702. The UA 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a track wheel, an exit or escape key, a trackball, and other navigational or functional keys, which may be inwardly depressed to provide further input function. The UA 10 may present options for the user to select, controls for the user to actuate, and/or cursors or other indicators for the user to direct.

The UA 10 may further accept data entry from the user, including numbers to dial or various parameter values for configuring the operation of the UA 10. The UA 10 may further execute one or more software or firmware applications in response to user commands. These applications may configure the UA 10 to perform various customized functions in response to user interaction. Additionally, the UA 10 may be programmed and/or configured over-the-air, for example from a wireless base station, a wireless access point, or a peer UA 10.

Among the various applications executable by the UA 10 are a web browser, which enables the display 702 to show a web page. The web page may be obtained via wireless communications with a wireless network access node, a cell tower, a peer UA 10, or any other wireless communication network or system 700. The network 700 is coupled to a wired network 708, such as the Internet. Via the wireless link and the wired network, the UA 10 has access to information on various servers, such as a server 710. The server 710 may provide content that may be shown on the display 702. Alternately, the UA 10 may access the network 700 through a peer UA 10 acting as an intermediary, in a relay type or hop type of connection.

Figure 10:
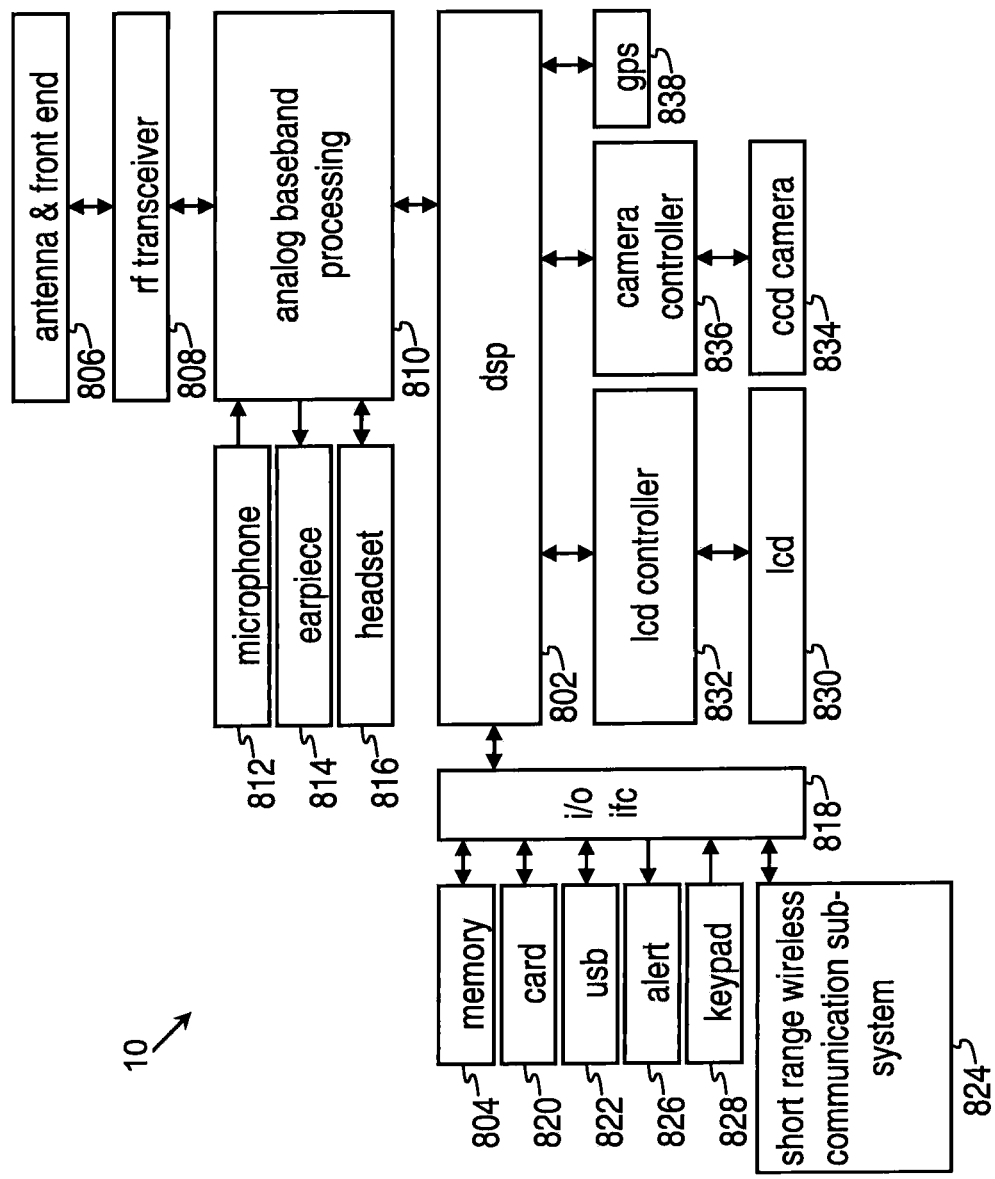
FIG. 10 is an illustration of a user agent operable for the some of the various embodiments of the disclosure.

FIG. 10 shows a block diagram of the UA 10. While a variety of known components of UAs 110 are depicted, in an embodiment a subset of the listed components and/or additional components not listed may be included in the UA 10. The UA 10 includes a digital signal processor (DSP) 802 and a memory 804. As shown, the UA 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UA 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the UA 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UA 10 to send and receive information from a cellular network or some other available wireless communications network or from a peer UA 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF Transceiver 808, portions of the Antenna and Front End 806, and the analog baseband processing unit 810 may be combined in one or more processing units and/or application specific integrated circuits (ASICs).

The analog baseband processing unit 810 may provide various analog processing of inputs and outputs, for example analog processing of inputs from the microphone 812 and the headset 816 and outputs to the earpiece 814 and the headset 816. To that end, the analog baseband processing unit 810 may have ports for connecting to the built-in microphone 812 and the earpiece speaker 814 that enable the UA 10 to be used as a cell phone. The analog baseband processing unit 810 may further include a port for connecting to a headset or other hands-free microphone and speaker configuration. The analog baseband processing unit 810 may provide digital-to-analog conversion in one signal direction and analog-to-digital conversion in the opposing signal direction. In some embodiments, at least some of the functionality of the analog baseband processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the UA 10 and may also enable the UA 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the UA 10 to communicate wirelessly with other nearby mobile devices and/or wireless base stations.

The input/output interface 818 may further connect the DSP 802 to the alert 826 that, when triggered, causes the UA 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the UA 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a track wheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the UA 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the UA 10 to determine its position. Various other peripherals may also be included to provide additional functions, e.g., radio and television reception.

Figure 11:
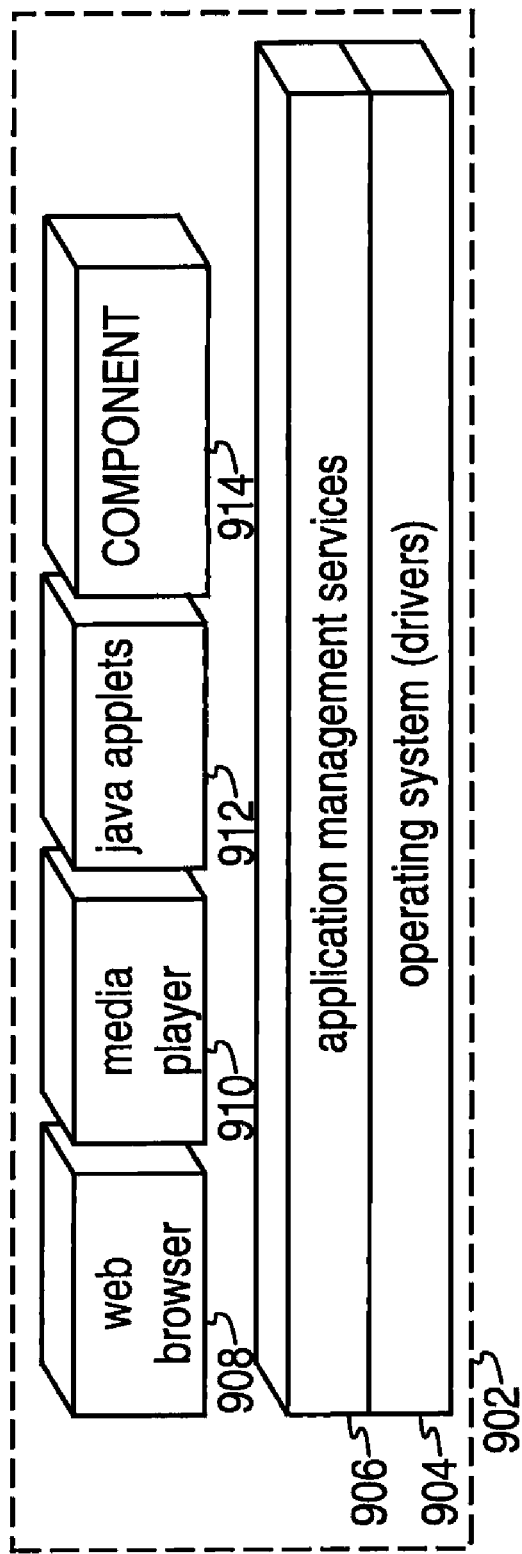
FIG. 11 is an illustration of a software environment that may be implemented on a user agent operable for some of the various embodiments of the disclosure.

FIG. 11 illustrates a software environment 902 that may be implemented by the DSP 802. The DSP 802 executes operating system drivers 904 that provide a platform from which the rest of the software operates. The operating system drivers 904 provide drivers for the UA hardware with standardized interfaces that are accessible to application software. The operating system drivers 904 include application management services ("AMS") 906 that transfer control between applications running on the UA 10. Also shown in FIG. 11 are a web browser application 908, a media player application 910, and Java applets 912. The web browser application 908 configures the UA 10 to operate as a web browser, allowing a user to enter information into forms and select links to retrieve and view web pages. The media player application 910 configures the UA 10 to retrieve and play audio or audio-visual media. The Java applets 912 configure the UA 10 to provide games, utilities, and other functionality. A component 914 might provide functionality described herein.

Figure 12:
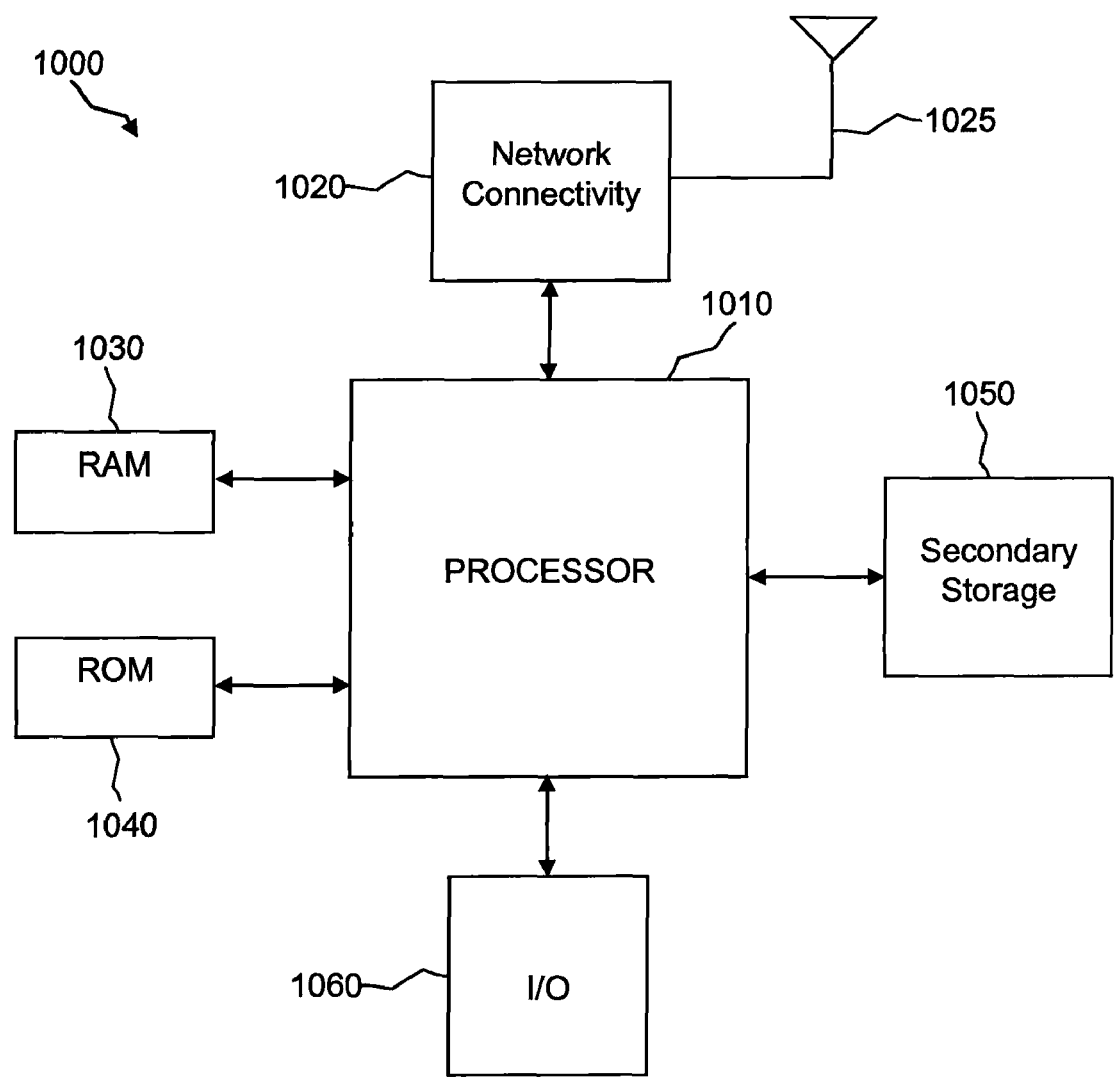
FIG. 12 is an illustration of a general purpose computer system suitable for some of the various embodiments of the disclosure.

The UA 10, access device 120, and other components described above might include a processing component that is capable of executing instructions related to the actions described above. FIG. 12 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some embodiments, a program for implementing the determination of a minimum number of HARQ process IDs may be stored in ROM 1040. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the UA 10, such as the display 702 and the input 704.

The following 3rd Generation Partnership Project (3GPP) Technical Specifications (TS) are incorporated herein by reference: TS 36.212, and TS 36.213.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented. As another example, with respect to the FIGS. 7 and 8 embodiment where the RIV value is set to a value that will not be normally used in the resource block assignment field, any unused RIV value may be used. For instance, instead of using RIV=$2^n-1$, a RIV value of $2^n-2$ or $2^n-3$ could be used.

In addition, any subset of DCI field data could be used to indicate that a UA should release SPS resources. Moreover, as indicated above, one SPS release value could be used to indicate that a UA should release all uplink SPS resources, a second SPS release value could be used to indicate that a UA should release all downlink SPS resources and a third value could be used to indicate that the UA should release all uplink and downlink SPS resources.

Moreover, while specific values are described in the context of Table 2 above, it should be appreciated that other values are contemplated. For instance, instead of requiring all "1's" in the TPC, DM-RS and MCS DCI fields, the required value for SPS release for DCI format 0 may include "10", "101" and "10101" in the TPC, DM-RS and MCS fields, respectively.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

To apprise the public of the scope of this invention, the following claims are made:

What is claimed is:

1. A method for causing a user agent to release at least one of uplink and downlink semi-persistent communication resources in a mobile communication system, the method comprising the steps of, at the user agent:

receiving a downlink communication via a physical downlink control channel (PDCCH);

using a semi persistent scheduling radio temporary network identifier (SPS-RNTI) assigned to the device to decode a control message on physical downlink control channel (PDCCH) which includes downlink control information (DCI) value in a plurality of DCI fields arranged in a DCI format; and releasing at least one of the uplink and down link semi-persistent communication resources when the DCI value from at least one of the DCI fields is identical to a fixed SPS release value, and wherein, when the DCI format is one of a DCI format 1, DCI format 1A, DCI format 2 and DCI format 2A, the at least a DCI field is at least one of a HARQ process number field, a modulation and coding scheme (MCS) field, a redundancy version field and a new data indicator (NDI) field.

2. The method of claim 1 wherein one of the DCI fields includes a resource block assignment field.

3. The method of claim 2 wherein the SPS release value is set to a fixed value.

4. The method of claim 1 wherein the step of releasing communication resources includes releasing resources when the data from each of the plurality of DCI fields is identical to an associated fixed SPS value.

5. The method of claim 1 wherein at least one of the DCI fields includes at least a resource block assignment field, a transmit power control (TPC) command field, a cyclic shift demodulation reference signal (DM RS) field, a modulation and coding scheme (MCS) and redundancy version field.

6. The method of claim 5 wherein, when the DCI format is DCI format 0, the at least a DCI field is at least one of a TPC command field, a cyclic shift DM RS field, an MCS and redundancy version field.

7. The method of claim 6 wherein the SPS release values for the MCS and redundancy field, the NDI field are 11111 and zero, respectively.

8. The method of claim 1 wherein the SPS release values for the HARQ process number field is set to a fixed value.

9. The method of claim 1 wherein the SPS release value for the MCS field includes all 1's where the DCI format is 1A.

10. The method of claim 1 wherein the SPS release value for the redundancy version field is set to a fixed value where the DCI format is one of 1 and 1A.

11. The method of claim 2 wherein the SPS release value includes a resource block assignment field value, only a subset of possible resource block assignment field values are used to indicate resource assignment and wherein the SPS release value includes a resource block assignment field value other than one of the values in the subset.

12. The method of claim 1 wherein the step of releasing includes releasing when the data from all of the DCI fields is identical to the fixed SPS release value.

13. A method for causing a user agent to validate deactivation of at least one of an uplink and downlink semi-persistent communication resource in a mobile communication system, the method comprising the steps of, at the user agent:
    receiving a downlink communication via a physical downlink control channel (PDCCH);
    using a semi persistent scheduling radio temporary network identifier (SPS-RNTI) assigned to the device to decode a control message on physical downlink control channel (PDCCH) which includes downlink control information (DCI) value in a plurality of DCI fields arranged in a DCI format;
    verifying that data from at least one of the DCI fields matches an SPS release value;
    releasing at least one of the uplink and downlink semi-persistent communication resource when the verification is successful and
    considering the received message as having been received with a non-matching CRC when verification is unsuccessful; and
    wherein, when the DCI format is one of a DCI format 1, DCI format 1A, DCI format 2 and DCI format 2A, the at least a second DCI field is at least one of a HARQ process number field, a modulation and coding scheme (MCS) field, a redundancy version field and a new data indicator (NDI) field.

14. An apparatus for causing a user agent to release at least one of uplink and downlink semi-persistent communication resources in a mobile communication system, the apparatus comprising:
    a processor configured to perform the steps of:
    receiving a downlink communication via a physical downlink control channel (PDCCH);
    using a semi persistent scheduling radio temporary network identifier (SPS-RNTI) assigned to the device to decode a control message on physical downlink control channel (PDCCH) which includes downlink control information (DCI) value in a plurality of DCI fields arranged in a DCI format; and
    releasing at least one of the uplink and down link semi-persistent communication resources when the DCI value from at least one of the DCI fields is identical to a fixed SPS release value; and
    wherein, when the DCI format is one of a DCI format 1, DCI format 1A, DCI format 2 and DCI format 2A, the at least a second DCI field is at least one of a HARQ process number field, a modulation and coding scheme (MCS) field, a redundancy version field and a new data indicator (NDI) field.

15. The apparatus of claim 14 wherein one of the DCI fields includes a resource block assignment field.

16. The apparatus of claim 15 wherein the SPS release value is set to a fixed value.

17. The apparatus of claim 14 wherein the processor performs the step of releasing communication resources by releasing resources when the data from each of the plurality of DCI fields is identical to an associated fixed SPS value.

18. The apparatus of claim 14 wherein at least one of the DCI fields includes at least a resource block assignment field, a transmit power control (TPC) command field, a cyclic shift demodulation reference signal (DM RS) field, a modulation and coding scheme (MCS) and redundancy version field and a new data indicator field.

19. The apparatus of claim 18 wherein, when the DCI format is DCI format 0, the at least a DCI field is at least one of a TPC command field, a cyclic shift DM RS field, and an MCS and redundancy version field.

20. The apparatus of claim 19 wherein the SPS release values for the MCS and redundancy field and the NDI field are 11111 and zero, respectively.

21. The apparatus of claim 14 wherein the SPS release value for the HARQ process number field is set to a fixed value.

22. The apparatus of claim 14 wherein the SPS release value for the MCS field includes all 1's where the DCI format is 1A.

23. The apparatus of claim 14 wherein the SPS release value for the redundancy version field is set to a fixed value where the DCI format is one of 1 and 1A and includes an enabled transport block set to 11 where the DCI format is one of 2 and 2A.

24. The apparatus of claim 15 wherein the SPS release value includes a resource block assignment field value, only a subset of possible resource block assignment field values are used to indicate resource assignment and wherein the SPS release value includes a resource block assignment field value other than one of the values in the subset.

25. The apparatus of claim 14 wherein the processor performs the step of releasing by releasing when the data from all of the DCI fields is identical to the fixed SPS release value.

26. An apparatus for causing a user agent to validate deactivation of at least one of an uplink and downlink semi-persistent communication resource in a mobile communication system, the apparatus comprising the steps of, at the user agent:
    using a processor to perform the steps of:
    receiving a downlink communication via a physical downlink control channel (PDCCH);
    using a semi persistent scheduling radio temporary network identifier (SPS-RNTI) assigned to the device to decode a control message on physical downlink control channel (PDCCH) which includes downlink control information (DCI) value in a plurality of DCI fields arranged in a DCI format;
    verifying that data from at least one of the DCI fields matches an SPS release value; releasing at least one of the uplink and downlink semi-persistent communication resource when the verification is successful and
    considering the received message as having been received with a non-matching CRC when the verification is unsuccessful; and
    wherein, when the DCI format is one of a DCI format 1, DCI format 1A, DCI format 2 and DCI format 2A, the at least a second DCI field is at least one of a HARQ process number field, a modulation and coding scheme (MCS) field, a redundancy version field and a new data indicator (NDI) field.

* * * * *